(12) United States Patent
Paek et al.

(10) Patent No.: US 11,383,485 B2
(45) Date of Patent: Jul. 12, 2022

(54) PLASTIC LAMINATED FILM

(71) Applicant: LG CHEM, LTD., Seoul (KR)

(72) Inventors: Kwan Yeol Paek, Daejeon (KR); Soon Yong Park, Daejeon (KR); Young Ji Tae, Daejeon (KR); Young Seok Park, Daejeon (KR); Bi Oh Ryu, Daejeon (KR); Il Hwan Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 444 days.

(21) Appl. No.: 16/320,356

(22) PCT Filed: Nov. 14, 2017

(86) PCT No.: PCT/KR2017/012890
§ 371 (c)(1),
(2) Date: Jan. 24, 2019

(87) PCT Pub. No.: WO2018/124466
PCT Pub. Date: Jul. 5, 2018

(65) Prior Publication Data
US 2019/0263095 A1   Aug. 29, 2019

(30) Foreign Application Priority Data

Dec. 27, 2016  (KR) .................. 10-2016-0180349

(51) Int. Cl.
*B32B 27/28*   (2006.01)
*B32B 27/34*   (2006.01)
(Continued)

(52) U.S. Cl.
CPC ............... *B32B 7/022* (2019.01); *B32B 7/10* (2013.01); *B32B 27/08* (2013.01); *B32B 27/18* (2013.01);
(Continued)

(58) Field of Classification Search
CPC .......... B32B 27/08; B32B 7/10; B32B 27/18; B32B 27/281; B32B 27/34;
(Continued)

(56) References Cited

U.S. PATENT DOCUMENTS

2007/0149758 A1   6/2007   Wang et al.
2015/0225607 A1   8/2015   Cho et al.
(Continued)

FOREIGN PATENT DOCUMENTS

CN   1898298 A   1/2007
CN   105899581 A   8/2016
(Continued)

OTHER PUBLICATIONS

Machine translation of JP 2011-251450. (Year: 2011).*
European Search Report issued for European Patent Application No. 17888906.9 dated Jun. 25, 2019, 7 pages.
(Continued)

*Primary Examiner* — John D Freeman
(74) *Attorney, Agent, or Firm* — Rothwell, Figg, Ernst & Manbeck, P.C.

(57) ABSTRACT

A plastic laminated film comprising a first layer comprising a polyamideimide copolymer and a second layer provided on at least one surface of the first layer and comprising a polyimide copolymer. The plastic laminated film has both excellent mechanical properties and UV weathering resistance while being colorless and transparent, and can be suitably used as cover films for various flexible or foldable devices.

11 Claims, 1 Drawing Sheet

(51) Int. Cl.
  *B32B 7/022* (2019.01)
  *B32B 27/08* (2006.01)
  *B32B 7/10* (2006.01)
  *B32B 27/18* (2006.01)
  *C08J 7/046* (2020.01)

(52) U.S. Cl.
  CPC ............ *B32B 27/281* (2013.01); *B32B 27/34* (2013.01); *C08J 7/046* (2020.01); *B32B 2250/02* (2013.01); *B32B 2250/03* (2013.01); *B32B 2250/24* (2013.01); *B32B 2250/40* (2013.01); *B32B 2307/412* (2013.01); *B32B 2307/51* (2013.01); *B32B 2307/536* (2013.01); *B32B 2307/71* (2013.01); *B32B 2307/712* (2013.01); *B32B 2307/714* (2013.01); *B32B 2457/20* (2013.01); *Y10T 428/31721* (2015.04)

(58) Field of Classification Search
  CPC .......... B32B 2250/24; B32B 2307/412; B32B 2250/03; B32B 2250/40; B32B 2307/536; B32B 2307/712; B32B 2250/02; B32B 2307/714; B32B 2307/71; B32B 2307/51; B32B 2457/20; B32B 7/023; B32B 7/022; B32B 2307/734; Y10T 428/31721; C09D 179/08; C08G 73/1039; C08G 73/14; C08J 2379/08; C08J 2479/08; C08J 7/042; C08J 5/18
  See application file for complete search history.

(56) References Cited

U.S. PATENT DOCUMENTS

| | | | |
|---|---|---|---|
| 2015/0361232 A1* | 12/2015 | Cho | ................... C08G 73/1017 524/261 |
| 2016/0185926 A1 | 6/2016 | Song et al. | |
| 2016/0194448 A1 | 7/2016 | Song et al. | |
| 2016/0222166 A1 | 8/2016 | Ahn et al. | |
| 2016/0319076 A1 | 11/2016 | Ju et al. | |

FOREIGN PATENT DOCUMENTS

| | | | |
|---|---|---|---|
| GB | 1383985 A | | 2/1974 |
| JP | S48-048533 A | | 7/1973 |
| JP | 2011251450 A | * | 12/2011 |
| JP | 2012-082392 A | | 4/2012 |
| KR | 10-2013-0007238 A | | 1/2013 |
| KR | 10-1230078 B1 | | 2/2013 |
| KR | 10-2015-0076114 A | | 7/2015 |
| KR | 10-2015-0077177 A | | 7/2015 |
| KR | 10-2016-0079549 A | | 7/2016 |
| KR | 10-2016-0083738 A | | 7/2016 |
| KR | 10-2016-0095910 A | | 8/2016 |
| WO | 2004-036661 A2 | | 4/2004 |
| WO | 2013-114685 A1 | | 8/2013 |

OTHER PUBLICATIONS

PCT Search Report & Written Opinion issued for International Application No. PCT/KR2017/012890 dated Mar. 14, 2018, 10 pages.

* cited by examiner

[FIG. 1]
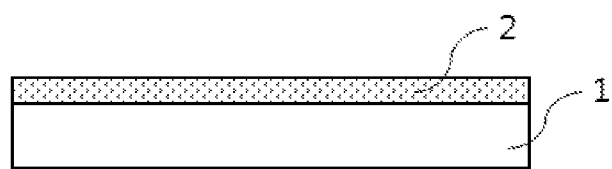
[FIG. 2]
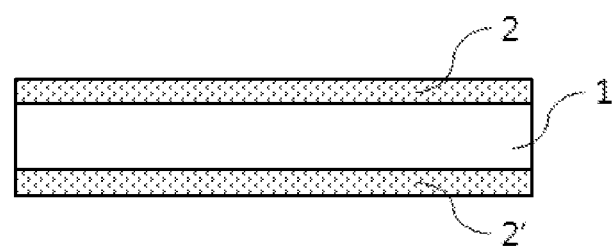

PLASTIC LAMINATED FILM

CROSS-REFERENCE TO RELATED APPLICATION

This application is a 35 U.S.C. § 371 National Phase Entry Application from PCT/KR2017/012890, filed on Nov. 14, 2017, and designating the United States, which claims the benefit of Korean Patent Application No. 10-2016-0180349 filed on Dec. 27, 2016 with the Korean Intellectual Property Office, the disclosure of which is incorporated herein by reference in its entirety.

TECHNICAL FIELD

The present disclosure relates to a plastic laminated film.

BACKGROUND OF ART

As interest in electronic devices that can bend or fold as one of the next generation display technologies increases, development of materials that can replace glass substrates for protecting display devices is required.

Cover films of flexible or foldable devices are required to have colorless transparency like glass, and excellent physical properties such as hardness, bending strength, dimensional stability, chemical resistance, moisture resistance, weathering resistance, and the like.

Recently, polyimide-based polymers have been attracting attention as materials that satisfy such characteristics, and polyamideimide having a polyamide unit structure introduced into polyimide for improving the hardness of the polyimide has been proposed.

However, the polyamideimide has a tendency to easily form haze as the thickness of the formed film using the same is increased due to high crystallinity.

In addition, as the polyamideimide has low weathering resistance to UV, the yellowness index increases and the film changes to yellow when the film is exposed to UV for a long time.

Although a method of improving the UV weathering resistance by increasing the content of the polyimide unit structure in the polyamideimide structure has been proposed, there still exists a limit in that the properties of the film such as hardness and yellowness index are relatively deteriorated.

DETAILED DESCRIPTION OF THE INVENTION

Technical Problem

The present disclosure is to provide a plastic laminated film exhibiting excellent mechanical properties and UV weathering resistance while being colorless and transparent.

Technical Solution

The present disclosure provides a plastic laminated film including:
a first layer including a polyamideimide copolymer; and
a second layer provided on at least one surface of the first layer and including a polyimide copolymer,
wherein $\Delta YI$ represented by the following Mathematical Formula 1 is 2.0 or less:

$$\Delta YI = YI_1 - YI_0 \qquad \text{[Mathematical Formula 1]}$$

wherein, in Mathematical Formula 1, $YI_0$ and $YI_1$ are yellowness indexes of the film measured according to ASTM D1925, where $YI_0$ is an initial yellowness index of the film, and $YI_1$ is a yellowness index of the film exposed to ultraviolet light and moisture for 96 hours according to ASTM G53.

Hereinafter, the plastic laminated film according to the exemplary embodiments of the present disclosure will be described in more detail.

In this specification, terms are used merely to refer to specific embodiments, and are not intended to restrict the present disclosure unless it is explicitly expressed.

Singular expressions of the present disclosure may include plural expressions unless it is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

Also, the terms including ordinal numbers such as "first" and "second" are used to distinguish one component from another, and the components are not limited by the ordinal number. For example, within the scope of the present invention, the first component may also be referred to as a second component, and similarly, the second component may be referred to as a first component.

As a result of studies by the present inventors, it was confirmed that the plastic laminated film having a polyimide copolymer layer formed on at least one surface of a polyamideimide copolymer layer has both excellent mechanical properties and UV weathering resistance, and can be suitably used as cover films for various flexible or foldable devices.

According to one embodiment of the present disclosure, a plastic laminated film including:
a first layer including a polyamideimide copolymer; and
a second layer provided on at least one surface of the first layer and including a polyimide copolymer,
wherein $\Delta YI$ represented by the following Mathematical Formula 1 is 2.0 or less, is provided:

$$\Delta YI = YI_1 - YI_0 \qquad \text{[Mathematical Formula 1]}$$

wherein, in Mathematical Formula 1, $YI_0$ and $YI_1$ are yellowness indexes of the film measured according to ASTM D1925, where $YI_0$ is a initial yellowness index of the film, and $YI_1$ is a yellowness index of the film exposed to ultraviolet light and moisture for 96 hours according to ASTM G53.

According to the embodiment of the present disclosure, the plastic laminated film is composed of a first layer including a polyamideimide copolymer, and a second layer provided on at least one surface of the first layer and including a polyimide copolymer.

As an example, the plastic laminated film may be composed of a first layer (1) and a second layer (2) provided on one surface of the first layer as shown in FIG. 1.

As another example, the plastic laminated film may be composed of a first layer (1) and second layers (2 and 2') provided on both upper and lowersurfaces of the first layer as shown in FIG. 2.

In the plastic laminated film, the first layer includes a polyamideimide copolymer.

Preferably, the polyamideimide copolymer may be an imide of a polyamic acid resulting from copolymerizing an aromatic diamine monomer, an aromatic dianhydride monomer, and an aromatic dicarbonyl monomer.

Here, the aromatic diamine monomer may be at least one compound selected from the group consisting of 2,2'-bis(trifluoromethyl)-4,4'-biphenyldiamine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis(4-(4-aminophenoxy)phenyl)propane, 1,3-bis(4-aminophenoxy)benzene, and 4,4'-diaminobenzanilide.

The aromatic dianhydride monomer may be at least one compound selected from the group consisting of 3,3',4,4'-biphenyltetracarboxylic acid dianhydride, 2,2-bis-(3,4-dicarboxyphenyl)hexafluoropropane dianhydride, benzophenone tetracarboxylic dianhydride, pyromellitic dianhydride, benzophenone tetracarboxylic dianhydride, oxydiphthalic anhydride, cyclobutane tetracarboxylic dianhydride, cyclopentane tetracarboxylic dianhydride, and bis(3,4-dicarboxyphenyl)sulfone dianhydride.

In addition, the aromatic dicarbonyl monomer may be at least one compound selected from the group consisting of terephthaloyl chloride, isophthaloyl chloride, biphenyldicarbonyl chloride, terephthalic acid, pyridine-2,5-dicarbonyl chloride, pyridine-2,5-dicarboxylic acid, pyrimidine-2,5-dicarbonyl chloride, pyrimidine-2,5-dicarboxylic acid, 4,4'-biphenyldicarbonyl chloride, and 4,4'-biphenyldicarboxylic acid.

Preferably, the polyamideimide copolymer may be an imide of a polyamic acid resulting from copolymerizing 2,2'-bis(trifluoromethyl)-4,4'-biphenyldiamine, 3,3',4,4'-biphenyltetracarboxylic acid dianhydride, terephthaloyl chloride, and isophthaloyl chloride.

In the polyamideimide copolymer, the weight ratio of the imide unit structure to the amide unit structure may be 1:1 to 1:4, preferably 1:1.5 to 1:3.

If the weight ratio of the amide unit structure is too low, mechanical properties such as hardness of the film may be lowered and the yellowness index may be increased. However, if the weight ratio of the amide unit structure is too high, gelation may occur in the polymerization process, and the formed film may be hazy.

The polyamideimide copolymer may preferably have a weight average molecular weight of 10,000 to 1,000,000 g/mol.

In addition, the first layer may be prepared by a conventional method such as a dry method or a wet method using the polyamideimide copolymer or its precursor, the polyamic acid.

For example, the first layer may be prepared by applying a varnish containing the polyamideimide copolymer or its precursor, the polyamic acid, on an arbitrary substrate at a predetermined thickness to form a film, and then curing (heating) the film.

In the preparation of the varnish, an organic solvent such as N,N-dimethylacetamide, N-methyl-2-pyrrolidone, N,N-dimethylformamide, 1,3-dimethyl-2-imidazolidinone, tetramethyl urea, cyclohexanone, gamma-butyrolactone, or the same may be used.

In the plastic laminated film, the second layer provided on at least one surface of the first layer includes a polyimide copolymer.

Preferably, the polyimide copolymer may be an imide of a polyamic acid resulting from copolymerizing an aromatic diamine monomer and an aromatic dianhydride monomer.

Here, the aromatic diamine monomer may be at least one compound selected from the group consisting of 2,2'-bis(trifluoromethyl)-4,4'-biphenyldiamine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis(4-(4-aminophenoxy)phenyl)propane, 1,3-bis(4-aminophenoxy)benzene, and 4,4'-diaminobenzanilide.

In addition, the aromatic dianhydride monomer may be at least one compound selected from the group consisting of 3,3',4,4'-biphenyltetracarboxylic acid dianhydride, 2,2-bis-(3,4-dicarboxyphenyl)hexafluoropropane dianhydride, benzophenone tetracarboxylic dianhydride, pyromellitic dianhydride, benzophenone tetracarboxylic dianhydride, oxydiphthalic anhydride, cyclobutane tetracarboxylic dianhydride, cyclopentane tetracarboxylic dianhydride, and bis(3,4-dicarboxyphenyl)sulfone dianhydride.

Preferably, the polyimide copolymer may be an imide of a polyamic acid resulting from copolymerizing 2,2'-bis(trifluoromethyl)-4,4'-biphenyldiamine and 3,3',4,4'-biphenyltetracarboxylic acid dianhydride.

The polyimide copolymer may preferably have a weight average molecular weight of 10,000 to 1,000,000 g/mol.

In addition, the second layer may be prepared by a conventional method such as a dry method or a wet method using the polyimide copolymer or its precursor, the polyamic acid.

For example, the second layer may be prepared by applying a varnish containing the polyimide copolymer or its precursor, the polyamic acid, on at least one surface of the first layer at a predetermined thickness to form a film, and then curing (heating) the film.

In the preparation of the varnish, an organic solvent such as N,N-dimethylacetamide, N-methyl-2-pyrrolidone, N,N-dimethylformamide, 1,3-dimethyl-2-imidazolidinone, tetramethyl urea, cyclohexanone, gamma-butyrolactone, or the same may be used.

According to the embodiment of the present disclosure, the thickness ratio of the first layer and the second layer may preferably be 1:0.01 to 1:0.2.

That is, the thickness ratio of the first layer to the second layer is preferably 1:0.01 or more so that the effect of introducing the second layer into the plastic laminated film can be sufficiently manifested. However, if the thickness of the second layer is too thick, the yellowness index of the film becomes high, and it may become difficult to form a colorless transparent film. Therefore, the thickness ratio of the first layer to the second layer is preferably 1:0.2 or less.

Specifically, the thickness ratio of the first layer to the second layer may be 1:0.01 or more, 1:0.02 or more, 1:0.04 or more, 1:0.06 or more, 1:0.08 or more, or 1:0.1 or more, and the thickness ratio of the first layer to the second layer may be 1:0.2 or less or 1:0.15 or less.

In addition, the total thickness of the plastic laminated film may preferably be 10 to 100 μm.

The plastic laminated film may exhibit excellent mechanical properties and UV weathering resistance while being colorless and transparent in the entire thickness of the above range.

Specifically, the plastic laminated film may have a thickness of 10 μm or more, 20 μm or more, 30 μm or more, 40 μm or more, 45 μm or more, or 50 μm or more, and 100 μm or less, 90 μm or less, 80 μm or less, 70 μm or less, 60 μm or less, or 55 μm or less.

Particularly, according to the embodiment of the present disclosure, the plastic laminated film may preferably have ΔYI represented by the following Mathematical Formula 1 of 2.0 or less:

$$\Delta YI = YI_1 - YI_0 \qquad \text{[Mathematical Formula 1]}$$

wherein, in Mathematical Formula 1, $YI_0$ and $YI_1$ are yellowness indexes of the film measured according to ASTM D1925, where $YI_0$ is an initial yellowness index of the film, and $YI_1$ is a yellowness index of the film exposed to ultraviolet light and moisture for 96 hours according to ASTM G53.

The ΔYI value means the difference between the initial yellowness index of the film that is measured according to ASTM D1925 immediately after formation of the plastic laminated film ($YI_0$) and the yellowness index of the film measured according to ASTM D1925 after exposure of the film to ultraviolet light (UV) and moisture for 96 hours according to ASTM G53($YI_1$).

Polyimide or polyamideimide films generally exhibit a tendency to increase the yellowness index value with exposure time to ultraviolet light ($YI_0 < YI_1$).

Particularly, as the plastic laminated film satisfies the above-mentioned composition, the ΔYI value is as small as 1.0 or less, and may exhibit excellent UV weathering resistance.

As shown in the examples and comparative examples, the polyamideimide film has a ΔYI value as large as 3.0 or more, but the plastic laminated film has a small ΔYI value of 2.0 or less and may exhibit excellent UV weathering resistance.

Specifically, the plastic laminated film may have a ΔYI value of 2.0 or less, 1.75 or less, 1.50 or less, 1.40 or less, 1.30 or less, 1.25 or less, 1.10 or less, 1.00 or less, 0.95 or less, or 0.90 or less in the above-mentioned thickness range. Further, the plastic laminated film may have a ΔYI value of 0.10 or more, 0.20 or more, or 0.30 or more in the above-mentioned thickness range.

According to the embodiment of the present disclosure, the plastic laminated film may have a $YI_0$ value of 4.5 or less in the above-mentioned thickness range. Specifically, the laminated film may have a $YI_0$ value of 4.50 or less, 4.45 or less, 4.40 or less, 4.36 or less, or 3.19 to 4.36.

In addition, according to the embodiment of the present disclosure, the plastic laminated film may have a $YI_1$ value of 6.0 or less in the above-mentioned thickness range. Specifically, the laminated film may have a $YI_1$ value of 6.00 or less, 5.90 or less, 5.80 or less, 5.70 or less, 5.60 or less, 5.52 or less, or 3.83 to 5.52.

According to the embodiment of the present disclosure, the plastic laminated film may have a ΔYI value which tends to decrease as the thickness ratio of the second layer to the first layer increases in the above-mentioned thickness range (i.e., when closer from 1:0.01 to 1:0.2).

In addition, the plastic laminated film of the embodiment of the present disclosure may have a ΔYI value which tends to decrease as the curing (heating) temperature of the film increases during the formation.

According to the embodiment of the present disclosure, it is possible to have a ΔYI value in the above-mentioned range at a curing (heating) temperature of 200 to 350° C. during the formation of the plastic laminated film.

Specifically, the curing (heating) temperature of the first layer and the second layer during the formation of the plastic laminated film may be 200° C. or more, 220° C. or more, or 240° C. or more, and 350° C. or less, 330° C. or less, 310° C. or less, or 300° C. or less.

Meanwhile, according to the embodiment of the present disclosure, the second layer may further include a silane-based compound in the polyimide copolymer.

If the silane-based compound is included in the second layer, relatively low $YI_0$ and $YI_1$ values and improved UV weathering resistance can be exhibited as compared with films having the same thickness but not including the silane-based compound.

Preferably, the silane-based compound may include tetraethoxysilane.

The silane-based compound may be included in the second layer in an amount of 50 to 300 wt % or 50 to 150 wt % based on the polyimide copolymer.

That is, it is preferable that the silane-based compound is included in an amount of 50 wt % or more based on the polyimide copolymer, so that the effect of the silane-based compound in the second layer can be sufficiently manifested. However, if too much of the silane-based compound is included, mechanical properties of the film may be deteriorated. Accordingly, it is preferable that the silane-based compound is included in an amount of 300 wt % or less based on the polyimide copolymer.

For example, the silane-based compound may be included in an amount of 50 wt % or more, 75 wt % or more, or 90 wt % or more, and 300 wt % or less, 250 wt % or less, 200 wt % or less, or 150 wt % or less based on the solids content of the varnish for forming the second layer.

In addition, the plastic laminated film may have transmittance of 88% or more, 89% or more, 90% or more, or 88 to 91% with respect to visible light having a wavelength of 550 nm at a thickness of 50±5 μm.

Further, the plastic laminated film may have transmittance of 13% or less, 10% or less, 5% or less, 3% or less, or 2 to 13% with respect to ultraviolet light having a wavelength of 388 nm at a thickness of 50±5 μm.

Advantageous Effects

As the plastic laminated film according to the present disclosure exhibits excellent mechanical properties and UV weathering resistance while being colorless and transparent, it can be suitably used as cover films for various flexible or foldable devices.

BRIEF DESCRIPTION OF THE DRAWINGS

FIG. 1 shows a cross-section of a plastic laminated film according to an embodiment of the present disclosure.

FIG. 2 shows a cross-section of a plastic laminated film according to anther embodiment of the present disclosure.

DETAILED DESCRIPTION OF THE EMBODIMENTS

Hereinafter, preferred examples are provided for better understanding. However, these examples are for illustrative purposes only, and the invention is not intended to be limited by these examples.

Preparation Example 1

In a 1000 mL reactor equipped with a stirrer, a nitrogen injector, a dropping funnel, and a temperature controller, 42.5 g of dimethylacetamide was placed while slowly flowing nitrogen, the temperature of the reactor was adjusted to 25° C., and 4.4354 g (0.0138507 mol) of 2,2'-bis(trifluoromethyl)-4,4'-biphenyldiamine was added thereto to be completely dissolved. While maintaining the temperature of the solution at 25° C., 0.815 g (0.0027701 mol) of 3,3',4,4'-biphenyltetracarboxylic acid dianhydride was added thereto to be dissolved.

After the temperature of the solution was cooled down to −10° C., 0.2812 g (0.0013851 mol) of isophthaloyl chloride and 1.9684 g (0.0096955 mol) of terephthaloyl chloride were added thereto and polymerized for 12 hours or more to obtain a polyamic acid-containing varnish having a solid content concentration of 15% (w/V).

Dimethylacetamide was added to the prepared polyamic acid-containing varnish to dilute the solid content concentration to 5 wt % or less, followed by precipitation of the solid content with 10 L of methanol. The precipitated solid content was filtered and then dried in a vacuum oven at 100° C. for 6 hours or more to obtain a polyamideimide copolymer in the form of a solid (weight average molecular weight: 110,000 g/mol).

The polyamideimide copolymer was dissolved in dimethylacetamide to obtain a varnish containing polyamideimide having a solid content concentration of 15% (w/V).

Preparation Example 2

In a 100 mL reactor equipped with a stirrer, a nitrogen injector, a dropping funnel, and a temperature controller, 42.5 g of dimethylacetamide was placed while slowly flowing nitrogen, the temperature of the reactor was adjusted to 25° C., and 3.9088 g (0.012206 mol) of 2,2'-bis(trifluoromethyl)-4,4'-biphenyldiamine was added thereto to be completely dissolved. While maintaining the temperature of the solution at 25° C., 3.5912 g (0.012206 mol) of 3,3',4,4'-biphenyltetracarboxylic acid dianhydride was added thereto to be dissolved.

After the temperature of the solution was cooled down to −10° C., it was polymerized for 12 hours or more to obtain a polyamic acid-containing varnish having a solid content concentration of 15 wt % (w/V) (weight average molecular weight: 80,000 g/mol).

Preparation Example 3

100 wt % of tetraethoxysilane based on the solid content was added to the polyamic acid-containing varnish according to Preparation Example 2 and stirred to prepare a varnish.

Example 1

The polyamideimide-containing varnish of Preparation Example 1 was poured onto a substrate (UPILEX-75s, a polyimide film), applied using a film applicator in order to have a thickness of 49±1 μm after drying, and dried at 80° C. for 10 minutes to form a first coating layer.

Next, the varnish of Preparation Example 2 was poured onto the first coating layer, applied using a film applicator in order to have a thickness of 0.5±0.25 μm after drying, and dried at 80° C. for 5 minutes to form a second coating layer.

Then, the first and second coating layers were fixed to a frame of a vacuum oven, followed by curing at 280° C. for 30 minutes while flowing nitrogen, and then the cured film was peeled to obtain a plastic laminated film.

Example 2

A plastic laminated film was obtained in the same manner as in Example 1, except that the varnish of Preparation Example 2 was applied in order to have a thickness of 1.0±0.25 μm after drying.

Example 3

A plastic laminated film was obtained in the same manner as in Example 1, except that the varnish of Preparation Example 2 was applied in order to have a thickness of 1.5±0.25 μm after drying.

Example 4

A plastic laminated film was obtained in the same manner as in Example 1, except that the varnish of Preparation Example 2 was applied in order to have a thickness of 2.0±0.25 μm after drying.

Example 5

A plastic laminated film was obtained in the same manner as in Example 1, except that the varnish of Preparation Example 2 was applied in order to have a thickness of 2.5±0.25 μm after drying.

Example 6

A plastic laminated film was obtained in the same manner as in Example 1, except that the varnish of Preparation Example 2 was applied in order to have a thickness of 3.0±0.25 μm after drying.

Example 7

A plastic laminated film was obtained in the same manner as in Example 1, except that the varnish of Preparation Example 2 was applied in order to have a thickness of 3.5±0.25 μm after drying.

Example 8

A plastic laminated film was obtained in the same manner as in Example 1, except that the varnish of Preparation Example 2 was applied in order to have a thickness of 4.0±0.25 μm after drying.

Example 9

A plastic laminated film was obtained in the same manner as in Example 1, except that the varnish of Preparation Example 2 was applied in order to have a thickness of 4.5±0.25 μm after drying.

Example 10

A plastic laminated film was obtained in the same manner as in Example 1, except that the varnish of Preparation Example 2 was applied in order to have a thickness of 5.0±0.25 μm after drying.

Example 11

A plastic laminated film was obtained in the same manner as in Example 1, except that the varnish of Preparation Example 2 was applied in order to have a thickness of 5.5±0.25 μm after drying.

Example 12

A plastic laminated film was obtained in the same manner as in Example 1, except that the varnish of Preparation Example 2 was applied in order to have a thickness of 6.0±0.25 μm after drying.

Example 13

A plastic laminated film was obtained in the same manner as in Example 1, except that the varnish of Preparation Example 2 was applied in order to have a thickness of 6.5±0.25 μm after drying.

Example 14

A plastic laminated film was obtained in the same manner as in Example 1, except that the varnish of Preparation Example 2 was applied in order to have a thickness of 7.0±0.25 μm after drying.

Example 15

A plastic laminated film was obtained in the same manner as in Example 1, except that the varnish of Preparation Example 2 was applied in order to have a thickness of 7.5±0.25 μm after drying.

Example 16

A plastic laminated film was obtained in the same manner as in Example 1, except that the varnish of Preparation Example 2 was applied in order to have a thickness of 8.0±0.25 μm after drying.

Comparative Example 1

The polyamideimide-containing varnish of Preparation Example 1 was poured onto a substrate (UPILEX-75s, a polyimide film), applied using a film applicator in order to have a thickness of 49±1 μm after drying, and dried at 80° C. for 10 minutes to form a coating layer.

Then, the coating layer was fixed to a frame of a vacuum oven, followed by curing at 280° C. for 30 minutes while flowing nitrogen, and then the cured film was peeled to obtain a polyamideimide film.

Experimental Example 1

The following characteristics were measured for the films of Examples 1 to 16 and Comparative Example 1, and the results are shown in Tables 1 and 2 below.

(1) Yellowness index (Y.I.): The initial yellowness index ($YI_0$) of the film was measured according to the method of ASTM D1925 using a UV-2600 UV-Vis Spectrometer (SHIMADZU).

In addition, the film was exposed to ultraviolet light and moisture for 96 hours according to ASTM G53 [Practice for Operating Light- and Water-Exposure Apparatus (Fluorescent UV-Condensation Type) for Exposure of Nonmetallic Materials] using a QUV Accelerated Weathering Tester (Q-LAB), and then the yellowness index ($YI_1$) of the film was measured according to the method of ASTM D1925.

(2) Transmittance (T): The total light transmittance of the film was measured using a UV-2600 UV-Vis Spectrometer (SHIMADZU), and the transmittance ($T_0$) with respect to visible light having a wavelength of 550 nm and the transmittance ($T_0$) with respect to ultraviolet light having a wavelength of 388 nm is shown in Table 2.

In addition, the film was exposed to ultraviolet light and moisture for 96 hours according to ASTM G53 [Practice for Operating Light- and Water-Exposure Apparatus (Fluorescent UV-Condensation Type) for Exposure of Nonmetallic Materials] using a QUV Accelerated Weathering Tester (Q-LAB), and then the transmittance ($T_1$) of the film was measured in the same manner as above.

TABLE 1

|  | $YI_0$ | $YI_1$ | $\Delta YI$ |
| --- | --- | --- | --- |
| Example 1 | 3.61 | 5.52 | 1.91 |
| Example 2 | 3.69 | 5.09 | 1.40 |
| Example 3 | 3.71 | 4.58 | 0.87 |
| Example 4 | 3.74 | 4.52 | 0.78 |
| Example 5 | 3.78 | 4.50 | 0.72 |
| Example 6 | 3.81 | 4.49 | 0.68 |
| Example 7 | 3.84 | 4.48 | 0.64 |
| Example 8 | 3.86 | 4.41 | 0.55 |
| Example 9 | 3.87 | 4.35 | 0.48 |
| Example 10 | 3.90 | 4.35 | 0.45 |
| Example 11 | 3.95 | 4.36 | 0.41 |
| Example 12 | 4.01 | 4.40 | 0.39 |
| Example 13 | 4.10 | 4.47 | 0.37 |
| Example 14 | 4.11 | 4.53 | 0.42 |
| Example 15 | 4.23 | 4.65 | 0.42 |
| Example 16 | 4.36 | 4.74 | 0.38 |
| Comparative Example 1 | 3.56 | 6.12 | 2.56 |

TABLE 2

|  | T % (@550 nm) | | T % (@388 nm) | |
| --- | --- | --- | --- | --- |
|  | $T_0$ | $T_1$ | $T_0$ | $T_1$ |
| Example 1 | 88.66 | 88.81 | 3.28 | 2.85 |
| Example 2 | 88.63 | 88.87 | 2.86 | 2.59 |
| Example 3 | 88.58 | 88.80 | 2.58 | 2.39 |
| Example 4 | 88.55 | 88.74 | 2.46 | 2.08 |
| Example 5 | 88.49 | 88.74 | 2.35 | 2.04 |
| Example 6 | 88.49 | 88.72 | 2.27 | 2.00 |
| Example 7 | 88.45 | 88.73 | 2.20 | 1.98 |
| Example 8 | 88.47 | 88.70 | 2.26 | 1.94 |
| Example 9 | 88.43 | 88.65 | 1.95 | 1.89 |
| Example 10 | 88.42 | 88.67 | 1.99 | 1.87 |
| Example 11 | 88.40 | 88.61 | 1.93 | 1.85 |
| Example 12 | 88.42 | 88.58 | 1.90 | 1.83 |
| Example 13 | 88.39 | 88.55 | 1.85 | 1.81 |
| Example 14 | 88.35 | 88.52 | 1.70 | 1.81 |
| Example 15 | 88.37 | 88.42 | 1.66 | 2.15 |
| Example 16 | 88.33 | 88.44 | 1.43 | 1.65 |
| Comparative Example 1 | 88.74 | 89.04 | 2.90 | 2.63 |

Referring to Table 1, as the $YI_1$ value of the film according to Comparative Example 1 significantly increased to 6.12, the $\Delta YI$ value rapidly increased to 2.56.

On the other hand, referring to Tables 1 and 2, the laminated films according to Examples 1 to 16 exhibited the transmittance equivalent level to that of the film of Comparative Example 1, and the $\Delta YI$ values were as small as 0.37 to 1.91, indicating excellent UV weathering resistance.

Example 17

A plastic laminated film was obtained in the same manner as in Example 1, except that the varnish of Preparation Example 2 was applied in order to have a thickness of 2.0±0.25 μm after drying, and the first and second coating layers were fixed to a frame of a vacuum oven, followed by curing at 240° C. for 30 minutes while flowing nitrogen.

Example 18

A plastic laminated film was obtained in the same manner as in Example 1, except that the varnish of Preparation Example 2 was applied in order to have a thickness of 2.0±0.25 μm after drying, and the first and second coating layers were fixed to a frame of a vacuum oven, followed by curing at 250° C. for 30 minutes while flowing nitrogen.

Example 19

A plastic laminated film was obtained in the same manner as in Example 1, except that the varnish of Preparation Example 2 was applied in order to have a thickness of 2.0±0.25 μm after drying, and the first and second coating layers were fixed to a frame of a vacuum oven, followed by curing at 260° C. for 30 minutes while flowing nitrogen.

Example 20

A plastic laminated film was obtained in the same manner as in Example 1, except that the varnish of Preparation Example 2 was applied in order to have a thickness of 2.0±0.25 μm after drying, and the first and second coating layers were fixed to a frame of a vacuum oven, followed by curing at 270° C. for 30 minutes while flowing nitrogen.

Example 21

A plastic laminated film was obtained in the same manner as in Example 1, except that the varnish of Preparation Example 2 was applied in order to have a thickness of 2.0±0.25 μm after drying, and the first and second coating layers were fixed to a frame of a vacuum oven, followed by curing at 290° C. for 30 minutes while flowing nitrogen.

Example 22

A plastic laminated film was obtained in the same manner as in Example 1, except that the varnish of Preparation Example 2 was applied in order to have a thickness of 2.0±0.25 μm after drying, and the first and second coating layers were fixed to a frame of a vacuum oven, followed by curing at 300° C. for 30 minutes while flowing nitrogen.

Comparative Example 2

A polyamideimide film was obtained in the same manner as in Comparative Example 1, except that the coating layer was fixed to a frame of a vacuum oven, followed by curing at 240° C. for 30 minutes while flowing nitrogen.

Comparative Example 3

A polyamideimide film was obtained in the same manner as in Comparative Example 1, except that the coating layer was fixed to a frame of a vacuum oven, followed by curing at 250° C. for 30 minutes while flowing nitrogen.

Comparative Example 4

A polyamideimide film was obtained in the same manner as in Comparative Example 1, except that the coating layer was fixed to a frame of a vacuum oven, followed by curing at 260° C. for 30 minutes while flowing nitrogen.

Comparative Example 5

A polyamideimide film was obtained in the same manner as in Comparative Example 1, except that the coating layer was fixed to a frame of a vacuum oven, followed by curing at 270° C. for 30 minutes while flowing nitrogen.

Comparative Example 6

A polyamideimide film was obtained in the same manner as in Comparative Example 1, except that the coating layer was fixed to a frame of a vacuum oven, followed by curing at 290° C. for 30 minutes while flowing nitrogen.

Comparative Example 7

A polyamideimide film was obtained in the same manner as in Comparative Example 1, except that the coating layer was fixed to a frame of a vacuum oven, followed by curing at 300° C. for 30 minutes while flowing nitrogen.

Experimental Example 2

The yellowness index of the films of Examples 17 to 22 and Comparative Examples 2 to 7 were measured in the same manner as in Experimental Example 1, and the results are shown in Tables 3 and 4 below.

TABLE 3

| | Curing temp (° C.) | $YI_0$ | $YI_1$ | $\Delta YI$ |
|---|---|---|---|---|
| Example 17 | 240 | 3.38 | 4.67 | 1.29 |
| Example 18 | 250 | 3.46 | 4.73 | 1.27 |
| Example 19 | 260 | 3.51 | 4.75 | 1.24 |
| Example 20 | 270 | 3.70 | 4.74 | 1.04 |
| Example 4 | 280 | 3.74 | 4.52 | 0.78 |
| Example 21 | 290 | 4.05 | 4.35 | 0.30 |
| Example 22 | 300 | 4.20 | 4.35 | 0.15 |

TABLE 4

| | Curing temp (° C.) | $YI_0$ | $YI_1$ | $\Delta YI$ |
|---|---|---|---|---|
| Comparative Example 2 | 240 | 3.40 | 6.67 | 3.27 |
| Comparative Example 3 | 250 | 3.45 | 6.62 | 3.17 |
| Comparative Example 4 | 260 | 3.48 | 6.64 | 3.16 |
| Comparative Example 5 | 270 | 3.51 | 6.47 | 2.96 |
| Comparative Example 1 | 280 | 3.56 | 6.12 | 2.56 |
| Comparative Example 6 | 290 | 3.70 | 6.17 | 2.47 |
| Comparative Example 7 | 300 | 3.87 | 6.14 | 2.27 |

Referring to Table 4, as the $YI_1$ values of the films according to Comparative Examples 1 to 7 significantly increased from 6.12 to 6.67, the $\Delta YI$ values rapidly increased from 2.27 to 3.27.

On the other hand, referring to Table 3, it was confirmed that the films of Examples 4 and 17 to 22 exhibited excellent UV weathering resistance because the $\Delta YI$ values are as small as 0.15 to 1.29. In addition, it was confirmed that the ΔYI value tended to decrease as the curing (heating) temperature of the film according to the examples increased in the range of 240 to 300° C.

Example 23

A plastic laminated film was obtained in the same manner as in Example 1, except that the varnish of Preparation Example 3 was applied instead of the varnish of Preparation Example 2 in order to have a thickness of 2.0±0.25 μm after drying, and the first and second coating layers were fixed to a frame of a vacuum oven, followed by curing at 240° C. for 30 minutes while flowing nitrogen.

Example 24

A plastic laminated film was obtained in the same manner as in Example 1, except that the varnish of Preparation Example 3 was applied instead of the varnish of Preparation Example 2 in order to have a thickness of 2.0±0.25 μm after drying, and the first and second coating layers were fixed to a frame of a vacuum oven, followed by curing at 250° C. for 30 minutes while flowing nitrogen.

Example 25

A plastic laminated film was obtained in the same manner as in Example 1, except that the varnish of Preparation Example 3 was applied instead of the varnish of Preparation Example 2 in order to have a thickness of 2.0±0.25 μm after drying, and the first and second coating layers were fixed to a frame of a vacuum oven, followed by curing at 260° C. for 30 minutes while flowing nitrogen.

Example 26

A plastic laminated film was obtained in the same manner as in Example 1, except that the varnish of Preparation Example 3 was applied instead of the varnish of Preparation Example 2 in order to have a thickness of 2.0±0.25 μm after drying, and the first and second coating layers were fixed to a frame of a vacuum oven, followed by curing at 270° C. for 30 minutes while flowing nitrogen.

Example 27

A plastic laminated film was obtained in the same manner as in Example 1, except that the varnish of Preparation Example 3 was applied instead of the varnish of Preparation Example 2 in order to have a thickness of 2.0±0.25 μm after drying, and the first and second coating layers were fixed to a frame of a vacuum oven, followed by curing at 280° C. for 30 minutes while flowing nitrogen.

Example 28

A plastic laminated film was obtained in the same manner as in Example 1, except that the varnish of Preparation Example 3 was applied instead of the varnish of Preparation Example 2 in order to have a thickness of 2.0±0.25 μm after drying, and the first and second coating layers were fixed to a frame of a vacuum oven, followed by curing at 290° C. for 30 minutes while flowing nitrogen.

Example 29

A plastic laminated film was obtained in the same manner as in Example 1, except that the varnish of Preparation Example 3 was applied instead of the varnish of Preparation Example 2 in order to have a thickness of 2.0±0.25 μm after drying, and the first and second coating layers were fixed to a frame of a vacuum oven, followed by curing at 300° C. for 30 minutes while flowing nitrogen.

Experimental Example 3

The yellowness index of the films of Examples 23 to 29 was measured in the same manner as in Experimental Example 1, and the results are shown in Table 5 below.

TABLE 5

| | Curing temp (° C.) | $YI_0$ | $YI_1$ | ΔYI |
|---|---|---|---|---|
| Example 23 | 240 | 3.30 | 4.62 | 1.32 |
| Example 24 | 250 | 3.39 | 4.60 | 1.21 |
| Example 25 | 260 | 3.41 | 4.58 | 1.07 |
| Example 26 | 270 | 3.44 | 4.55 | 0.91 |
| Example 27 | 280 | 3.19 | 4.39 | 0.82 |
| Example 28 | 290 | 3.21 | 3.90 | 0.69 |
| Example 29 | 300 | 3.57 | 3.83 | 0.26 |

Referring to Table 5, the films of Examples 23 to 29 in which the tetraethoxysilane-containing varnish of Preparation Example 3 was used showed a tendency that the increase of the $YI_0$ value was slowed with an increase in the curing temperature, and had the small ΔYI value compared with the films of Examples 17 to 22 and Comparative Examples 1 to 7. Thus, it was confirmed that the films exhibit excellent UV weathering resistance while being colorless and transparent.

DESCRIPTION OF SYMBOLS

1: first layer including a polyamideimide copolymer
2: second layer including a polyimide copolymer
2': second layer including a polyimide copolymer

The invention claimed is:

1. A plastic laminated film comprising:
a first layer comprising a polyamideimide copolymer,
wherein the polyamideimide copolymer is an imide of a polyamic acid resulting from copolymerizing an aromatic diamine monomer, a dianhydride monomer, and an aromatic dicarbonyl monomer, and
a second layer provided on at least one surface of the first layer and comprising a polyimide copolymer,
wherein the polyimide copolymer is an imide of a polyamic acid resulting from copolymerizing an aromatic diamine monomer and a dianhydride monomer,
wherein each dianhydride monomer is an aromatic dianhydride monomer, cyclobutane tetracarboxylic dianhydride, or cyclopentane tetracarboxylic dianhydride, and
wherein the plastic laminate film has ΔYI represented by the following Mathematical Formula 1 of 2.0 or less:

[Mathematical Formula 1]

$$\Delta YI = YI_1 - YI_0$$

wherein, in Mathematical Formula 1, $YI_0$ and $YI_1$ are yellowness indexes of the film measured according to ASTM D1925,
where $YI_0$ is an initial yellowness index of the film, and $YI_1$ is a yellowness index of the film exposed to ultraviolet light and moisture for 96 hours according to ASTM G53, and
wherein the plastic laminated film has a transmittance of 88% or more with respect to visible light having a wavelength of 550 nm at a thickness of 50±5 μm, and a transmittance of 13% or less with respect to ultraviolet light having a wavelength of 388 nm at a thickness of 50±5 μm.

2. The plastic laminated film of claim 1,
wherein the second layer further comprises a silane-based compound in the polyimide copolymer.

3. The plastic laminated film of claim 2,
wherein the silane-based compound comprises tetraethoxysilane.

4. The plastic laminated film of claim 1,
wherein $YI_0$ is 4.5 or less and $YI_1$ is 6.0 or less.

5. The plastic laminated film of claim 1,
wherein each aromatic diamine monomer is independently at least one compound selected from the group of 2,2'-bis(trifluoromethyl)-4,4'-biphenyldiamine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis(4-(4-aminophenoxy)phenyl)propane, 1,3-bis(4-aminophenoxy)benzene, and 4,4'-diaminobenzanilide;
each aromatic dianhydride monomer is independently at least one compound selected from the group of 3,3',4,4'-biphenyltetracarboxylic acid dianhydride, 2,2-bis-(3,4-dicarboxyphenyl)hexafluoropropane dianhydride, benzophenone tetracarboxylic dianhydride, pyromellitic dianhydride, benzophenone tetracarboxylic dianhydride, oxydiphthalic anhydride, and bis(3,4-dicarboxyphenyl)sulfone dianhydride; and
the aromatic dicarbonyl monomer is at least one compound selected from the group of terephthaloyl chloride, isophthaloyl chloride, biphenyldicarbonyl chloride, terephthalic acid, pyridine-2,5-dicarbonyl chloride, pyridine-2,5-dicarboxylic acid, pyrimidine-2,5-dicarbonyl chloride, pyrimidine-2,5-dicarboxylic acid, 4,4'-biphenyldicarbonyl chloride, and 4,4'-biphenyldicarboxylic acid.

6. The plastic laminated film of claim 1,
wherein a thickness ratio of the first layer and the second layer is 1:0.01 to 1:0.2.

7. The plastic laminated film of claim 1,
wherein the film has a thickness of 10 to 100 μm.

8. A device comprising the plastic laminated film of claim 1 as a cover film,
wherein the device is a flexible or foldable device.

9. The plastic laminated film of claim 1,
wherein each aromatic diamine monomer is independently at least one compound selected from the group of 2,2'-bis(trifluoromethyl)-4,4'-biphenyldiamine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis(4-(4-aminophenoxy)phenyl)propane, 1,3-bis(4-aminophenoxy)benzene, and 4,4'-diaminobenzanilide.

10. The plastic laminated film of claim 1,
wherein each aromatic dianhydride monomer is independently at least one compound selected from the group of 3,3',4,4'-biphenyltetracarboxylic acid dianhydride, 2,2-bis-(3,4-dicarboxyphenyl)hexafluoropropane dianhydride, benzophenone tetracarboxylic dianhydride, pyromellitic dianhydride, benzophenone tetracarboxylic dianhydride, oxydiphthalic anhydride, and bis(3,4-dicarboxyphenyl)sulfone dianhydride.

11. The plastic laminated film of claim 1,
wherein the aromatic dicarbonyl monomer is at least one compound selected from the group of terephthaloyl chloride, isophthaloyl chloride, biphenyldicarbonyl chloride, terephthalic acid, pyridine-2,5-dicarbonyl chloride, pyridine-2,5-dicarboxylic acid, pyrimidine-2,5-dicarbonyl chloride, pyrimidine-2,5-dicarboxylic acid, 4,4'-biphenyldicarbonyl chloride, and 4,4'-biphenyldicarboxylic acid.

* * * * *